United States Patent [19]

Sugishita et al.

[11] Patent Number: 4,475,865
[45] Date of Patent: Oct. 9, 1984

[54] APPARATUS FOR CONTROLLING THE OPERATION OF A WATER TURBINE OR A PUMP TURBINE AND A METHOD THEREOF

[75] Inventors: Kaneo Sugishita, Ayase; Katsuyuki Kawahara, Tokyo, both of Japan

[73] Assignee: Tokyo Shibaura Denki Kabushiki Kaisha, Kawasaki, Japan

[21] Appl. No.: 342,409

[22] Filed: Jan. 25, 1982

[30] Foreign Application Priority Data

Jan. 30, 1981 [JP] Japan ................................. 56-12766

[51] Int. Cl.³ .............................................. F03B 15/08
[52] U.S. Cl. ....................................... 415/36; 415/500
[58] Field of Search ................. 415/1, 17, 36, 42, 500

[56] References Cited

U.S. PATENT DOCUMENTS

| | | | |
|---|---|---|---|
| 3,207,473 | 9/1965 | Madden | 415/42 X |
| 3,236,497 | 2/1966 | Wycliffe | 415/42 |
| 3,730,638 | 1/1973 | Kuwabara | 415/24 |
| 4,047,831 | 9/1977 | Mayo, Jr. et al. | 415/1 |
| 4,137,004 | 1/1979 | Kuwabara et al. | 415/1 |
| 4,253,794 | 3/1981 | Kuwabara | 415/36 X |
| 4,354,800 | 10/1982 | Kuwabara | 415/36 X |

FOREIGN PATENT DOCUMENTS

1176016 4/1967 United Kingdom .
1227726 2/1969 United Kingdom .

Primary Examiner—Stephen Marcus
Assistant Examiner—Joseph M. Pitko
Attorney, Agent, or Firm—Oblon, Fisher, Spivak, McClelland & Maier

[57] ABSTRACT

An increment speed per unit time from the detected rotation speed of a water turbine or a pump turbine with an inlet valve is compared with a prescribed increment to deliver a close order to the inlet valve, when the increment becomes greater than the prescribed increment, for closing the inlet valve to a prescribed opening. Then, a fully open order to the inlet valve is delivered under the condition that neither an emergency shutdown order nor a quick shutdown order is issued to the water turbine or the pump turbine, when a speed governor performs a normal operation.

18 Claims, 6 Drawing Figures

APPARATUS FOR CONTROLLING THE OPERATION OF A WATER TURBINE OR A PUMP TURBINE AND A METHOD THEREOF

BACKGROUND OF THE INVENTION

This invention relates to an apparatus for controlling the operation of a water turbine or a pump turbine and a method thereof.

During the power generation operation, a "water turbine or a pump turbine" is controlled by a speed governor. The speed governor detects the rotation speed of the water turbine or the pump turbine, opens and closes guide vanes according to a deviation with respect to a predetermined rotation speed, adjusts water energy supplied to the water turbine or the pump turbine, and keeps the rotation speed of the water turbine or the pump turbine to a predetermined value. The frequency of an electric power system is maintained constant by the action of the speed governor. Where any failure occurs in the electric power system, the governor acts as a protector for the water turbine or the pump turbine. However, in the case when lightning strikes the electric power system, the load of the generator is momentarily interrupted (hereinafter referred to as load rejection), so that water energy is no longer absorbed as electric power into the electric power system through the generator. For this reason, the water energy is instead converted to an acceleration energy to accelerate the water turbine or the pump turbine and thus cause the rotation speed of the water turbine or the pump turbine to increase sharply. In this case, the governor detects an increase in the rotation speed of the water turbine or the pump turbine, immediately closing the guide vanes etc. and decreasing the energy of water flowing into the water turbine or the pump turbine. In this way, the governor serves as a protector. Even if the rotation speed of the water turbine temporarily becomes higher than a rated rotation speed, the rotation speed of the water turbine or the pump turbine is reduce to the rated rotation speed or the predetermined rotation speed after lapse of a certain period. As a result, there is no possibility that the water turbine or the pump turbine will be permitted to rotate for a long period at a rotation speed higher than the rated rotation speed. It may, therefore, be said that the speed governor is a very important protector for the water turbine or the pump turbine during the power generation operation. For this reason, the speed governor requires not only a quick response but also absolute reliability with respect to an overall control system including the guide vanes and must have a high reliability in practice. In the water turbine or the pump turbine during the power generation operation there may rarely be encountered such an abnormal situation that in spite of detecting an increase in the rotation speed by the speed governor upon load rejection, the guide vanes are not closed due to the faults in, for example, a hydraulic system for opening and closing the guide vanes. In controlling the operation of the water turbine or the pump turbine it is important that a fail-safe protector be incorporated to prevent the propagation, over the whole power station, of a failure due to the guide vanes being not closed. An overspeed relay has been used as a protector for the case where the guide vanes are not closed upon load rejection. The overspeed relay is so constructed that it is operated when the rotation speed of the water turbine or the pump turbine becomes greater than a prescribed rotation speed $N_R$ in excess of a predetermined rated rotation speed. By the operation of the overspeed relay an emergency shutdown or a quick shutdown order is sent to a main machine. In this case, the emergency shutdown or the quick shutdown order is normally sent as a close order to both the inlet valve of the water turbine or the pump turbine and the guide vanes. Even if the guide vanes are not closed, for example, due to the failure of the hydraulic system, the water turbine or the pump turbine is protected, because the inlet valve is closed. In this method, however, the prescribed rotation speed $N_R$ at which the overspeed relay is operated cannot be set to a value near to the rated rotation speed. This is because if the prescribed rotation speed $N_R$ is set to a value near to the rated rotation speed the overspeed relay may be operated due to a slight decrease in the generator load even in the absence of any failure of the hydraulic system etc. The prescribed rotation speed $N_R$ at which the overspeed relay is operated is set to a rotation speed so high as to not usually encountered. Under these circumstances, when the guide vanes are not closed upon load rejection, the inlet valve is not immediately closed to permit the water turbine or the pump turbine to be promptly protected. This will be described in more detail.

Now suppose that with the generator operated with a power output of 100%, the rotation speed of the water turbine or the pump turbine reaches about 120 to 140% of the rated rotation speed upon momentary load rejection even if the speed governor or guide vanes perform a normal operation. Where the guide vanes are not closed, the water turbine or the pump turbine reaches a maximum runaway speed greater than when the guide vanes are closed. For this reason, the prescribed rotation speed $N_R$ at which the overspeed relay is operated is usually set to about 105% of a maximum overspeed when the guide vanes are normally operated. With the prescribed rotation speed $N_R$ set to a smaller, the time taken for the inlet valve to be closed will be shortened, but if the generator load is slightly decreased due to a minor failure of the electric power system the emergency or the quick shutdown of the water turbine or the pump turbine is effected, separating the generator from the electric power system. This impairs the original fundamental function that, while adjusting the output of the water turbine by opening or closing the guide vanes according to a change of the load through the use of the speed governor, the power generation operation is performed in the hydraulic power station. Such a situation is undesirable in the management of the electric power system.

When the operation control of the water turbine or the pump turbine is effected with the overspeed relay as a protector, if the guide vanes of the water turbine or the pump turbine are not closed even in the case of load rejection, it takes a considerable time (usually 5 to 10 seconds) for the inlet valve to start to be closed. Even where the inlet valve is closed, the water turbine or the pump turbine will reach a rotation speed about 10 to 20% as high as the maximum overspeed when the speed governor and guide vanes perform a normal operation. In an ordinary Francis type water turbine, even such a situation poses no problem in view of the flow rate characteristic below-mentioned. That is, since in this case only an increase in the rotation speed of the water turbine is involved, even if the water turbine undergoes a high-speed rotation, no problem is presented if a design consideration is paid to the strength of the apparatus with an adequate safety factor imparted thereto. In a method using the overspeed relay as a protector in the Francis type pump turbine and in particular the pump turbine of a lower specific speed (as determined by the configuration of the pump turbine) for a high head in particular, even where the pump turbine is so designed as to impart a large safety factor and thus endure even a high-speed rotation, if the guide vanes are not closed, a fairly long time will be required until the inlet valve starts to be closed, and the pump turbine will not be protected in a stable way, the reasons of which will be set out below.

Figure 1:
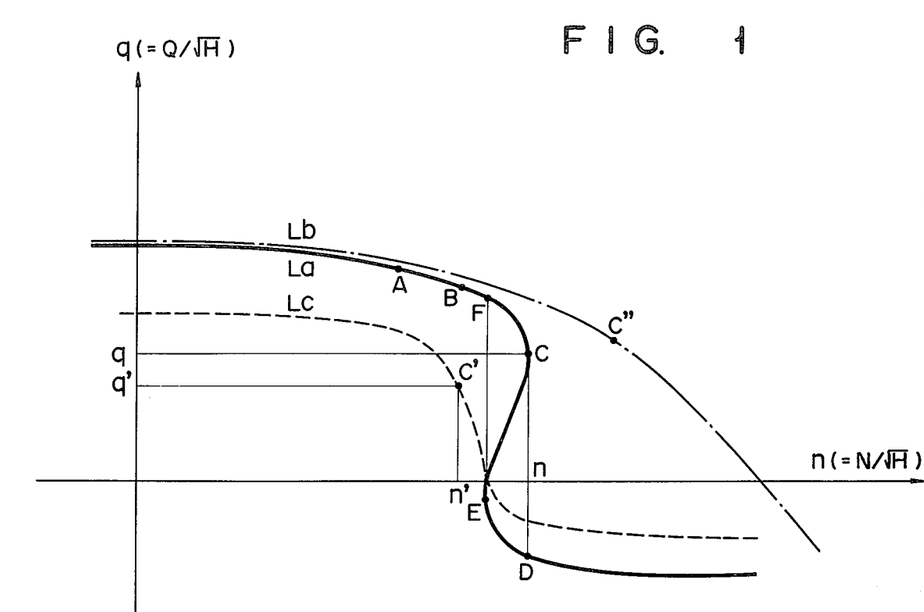
FIG. 1 shows the flow rate characteristic curve of a Francis type water turbine or a Francis type pump turbine.

That is, FIG. 1 shows the flow rate characteristic curve of a Francis type pump turbine of low specific speed. In FIG. 1, the abscissa shows the number of rotations, n, per unit head, and the ordinate shows a flow rate, q, per unit head. The solid line La in FIG. 1 shows the flow rate characteristic curve when the opening of the guide vanes corresponds to a substantially 100% opening of the guide vanes. In FIG. 1, $n = N/\sqrt{H}$ $q = Q/\sqrt{H}$ N = the number of rotations of the pump turbine
Q = the flow rate of the pump turbine
H = the net head of the pump turbine Now suppose that on a point A on a curve La in FIG. 1 the pump turbine is operated. In this case, if the guide vanes are not closed with the generator load interrupted, the rotation speed N of the pump turbine is increased and the operation point of the pump turbine is shifted from the point A through a point B to an operation point C at no load. At this time, the rotation speed N of the pump turbine reaches a peak. This value becomes greater than the maximum overspeed of the pump speed when the guide vanes are closed. Thereafter, the operation point is quickly shifted from the point C to a point D where the pump turbine serves as a reverse pump turbine i.e. the water flows in the pumping-up direction while the pump turbine is driven in such a direction as to drive the generator. Then, a deceleration torque is applied to the pump turbine, causing the operation point to be shifted to a point E and then to a point F where water flows into the pump turbine. At the point F, an accelerating torque is again applied to the pump turbine and the operating point is shifted again to the point D through the point C. In this way, the flow rate characteristic curve takes an S-shape. If in the Francis type pump turbine of low specific speed the guide vanes are not closed, the operation point is periodically shifted between the water turbine operation area and the reverse pump operation area with the no-load operation point as a center. A pressure at the inlet or outlet side of the pump turbine suffers a greater change in flow rate for a brief period due to a rapid change in the operation state by the pump turbine and is rapidly increased or decreased by a water hammer operation resulting from an inertia occuring in the water conduit. If the tailrace is particularly long, the pressure at the inlet or outlet side of the pump turbine involves a greater water pressure drop when the operation point is shifted to the point D at the reverse pump area due to the no-load operation. Where the pressure at the tailrace side of the pump turbine becomes lower than a saturated vapor pressure, a water column separation occurs, causing the occurrence of cavitation. The cavitation is immediately collapsed with a pressure increase, but there is a risk that the tailrace or the pump turbine will be destroyed due to an impulsive pressure increase upon recombination of the water column. In this way, a pressure drop occurs at the tailrace side owing to the S-shaped flow rate characteristic. With a branch conduit system, in particular, sharing a plurality of pump turbines, a prominent pressure drop occurs due to a mutual action between the pump turbines. That is, if with the generator load momentarily interrupted with respect to all the pump turbines, the guide vanes of one pump turbine are not closed, an overlap takes place between a pressure drop at the tailrace side resulting from the S-shaped flow rate characteristic of said one pump turbine and a pressure drop at the tailrace side resulting from the closure of the guide vanes of the other pump turbines. For this reason, the pressure at the tailrace side of the pump turbine whose guide vanes are not operated is dropped to a much lower level.

Where in the water conduit system the ratio of the number of branch water conduits shared by the pump turbines to the whole water conduit system is smaller with the water level located higher than the center position of the pump turbine i.e. with the deeper static draft head involved, there occurs a situation where the guide vanes of the pump turbine are not closed upon load rejection, leading to no water column separation even if a pressure drop occurs at the tailrace side. Where in such a situation the conventional overspeed relay is used as a protector, even if the guide vanes are not closed, the inlet valve is closed by the operation of the overspeed relay, permitting the pump turbine to be safely protected.

Recently, to lower civil engineering and construction costs in power stations, however, a plurality of pump turbines have been mounted with the static draft head set as low as possible with respect to the pump turbine. A meeting point of the branch conduits is then provided in the neighborhood of the tailrace of the pump turbine. One pressure conduit is accordingly disposed between the meeting point and the water/pump turbine to permit the use of only one tailrace. Now suppose that in such a power station the conventional overspeed relay is used as a protector. If in this case the guide vanes are not closed upon load rejection, the overspeed relay starts to be operated a little before the rotation speed of the pump turbine reaches its peak value, starting to close the inlet valve. It is therefore impossible to avoid a pressure drop at the tailrace immediately after the rotation speed of the pump turbine reaches its peak value, as well as to avoid a water column separation due to the pressure drop. If an attempt is made to safely protect the tailrace and pump turbine at the power station even if the guide vanes are not closed, the inlet valve needs to be closed immediately after the load is interrupted. Since the flow rate characteristic curve of the Francis type water turbine is then as indicated by the curve Lb in FIG. 1, there is no possibility that the operation point will enter into the reverse pump area through the no-load operation point C''. Even in the pump turbine having such a characteristic as indicated by a curve La in FIG. 1, if the inlet valve is opened to a smaller extent, the characteristic of the pump turbine becomes that as indicated by a curve Lc. With both the net head of the pump turbine and loss head at the inlet valve in mind, the flow rate characteristic of the pump turbine at this time is expressed as follows:

$H' = H - \zeta Q^2$

H: the net head with the inlet valve fully opened
H′: the net head with the smaller opening of the inlet valve
Q: the flow rate
ζ: loss coefficient of the inlet valve Thus, for example, the no-load operation point C (n, q) of the curve La in FIG. 1 is shifted to a point C′ (n′, q′) of the curve Lc. At this time, n′, q′ are expressed as follows:

$$n' = \frac{N}{\sqrt{H'}} = \frac{N}{\sqrt{H}} \sqrt{\frac{H}{H + SQ^2}} = \frac{n}{\sqrt{1 + \zeta q^2}}$$

$$q' = \frac{Q}{\sqrt{H'}} = \frac{Q}{\sqrt{H}} \sqrt{\frac{H}{H + SQ^2}} = \frac{q}{\sqrt{1 + \zeta q^2}}$$

From the above it is understood that with the inlet valve set to the smaller opening the S-shaped flow rate characteristic curve of the pump turbine including the inlet valve will become gentle. Even where the guide vanes are in the inoperative state upon load rejection, if the inlet valve is closed, there is an advantage that it is possible to suppress the self-excited oscillation state due to the S-shaped flow rate characteristic of the pump turbine.

SUMMARY OF THE INVENTION

It is accordingly an object of this invention to provide a control device for controlling the operation of a water turbine or a pump turbine and a method thereof, in which when a generator load is interrupted and guide vanes are not closed for some reason or other an inlet valve is quickly closed to a smaller opening to protect the water turbine or the pump turbine and in which when the guide vanes perform a normal operation a normal governing operation is performed by the speed governor.

According to this invention there is provided an apparatus for controlling the operation of a water turbine or a pump turbine equipped with an inlet valve, and guide vanes adapted to be opened or closed by a speed governor comprising:

(1) a device for detecting a rotation speed of the water turbine or a pump turbine during a power generation operation;

(2) a load rejection control device including,
 (a) a load rejection detector connected to receive the rotation speed for comparing the rotation speed of the water turbine or the pump turbine with a first prescribed value and for producing a load rejection signal when the rotation speed of the water turbine or the pump turbine becomes greater than the prescribed value,
 (b) a governor state detector for receiving an input signal and for judging whether or not a speed governor performs a normal operation based on the input signal to produce a judgement signal when the speed governor is judged as being normal,
 (c) inlet valve open order device connected to receive the judgement signal for producing an output signal when neither an emergency shutdown order nor a quick shutdown order is issued,
 (d) an inlet valve close order device connected to receive the load rejection signal and connected to receive the output signal for producing an inlet valve close order based on the load rejection signal and the output signal, (3) an inlet valve control device connected to receive the inlet valve close order and connected to receive the output signal of the inlet valve open order device for producing a control signal to close the inlet valve to a prescribed opening when the inlet valve close order is received and for producing a control signal to open the inlet valve to a maximum opening when the output signal is received.

According to this invention, even if upon load rejection the governor does not perform a normal operation for some reason or other and the guide vanes are not closed, the water turbine or the pump turbine can be positively protected by the inlet valve.

In one aspect of this invention there is provided a method for controlling the operation of a water turbine or a pump turbine equipped with an inlet valve, and guide vanes adapted to be opened or closed by a speed governor comprising the steps of:

(1) detecting a rotation speed of the water turbine or the pump turbine during a power generation operation;

(2) finding an increment speed per unit time from the detected rotation speed of the water turbine or the pump turbine;

(3) comparing the increment with a prescribed increment;

(4) delivering a close order to the inlet valve when the increment becomes greater than the prescribed increment, to close the inlet valve to a prescribed opening;

(5) judging whether or not a speed governor performs a normal operation to produce a judgement signal when the speed governor is judged as being normal;

(6) locking the close order issued to the inlet valve by the judgement signal; and (7) delivering a fully open order to the inlet valve by the judgement signal under the condition that neither an emergency shutdown order nor a quick shutdown order is issued to the water turbine or the pump turbine.

In this method, even if the generator load is momentarily interrupted during a power generation load, the inlet valve can be immediately closed. For this reason, the S-shaped flow rate characteristic curve is relaxed and a stable rotation speed can be obtained for a brief time period.

DETAILED DESCRIPTION OF THE PREFERRED EMBODIMENT

Figure 2:
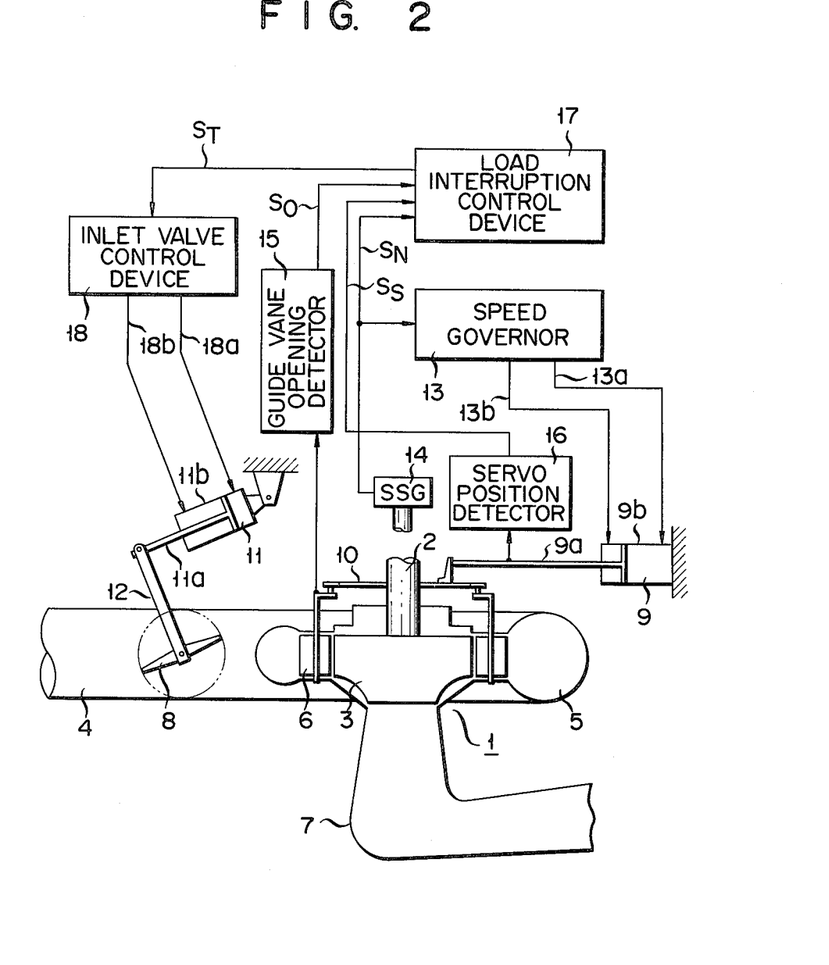
FIG. 2 is a diagrammatic view showing an apparatus as applied to the Francis type pump turbine.
Figure 3:
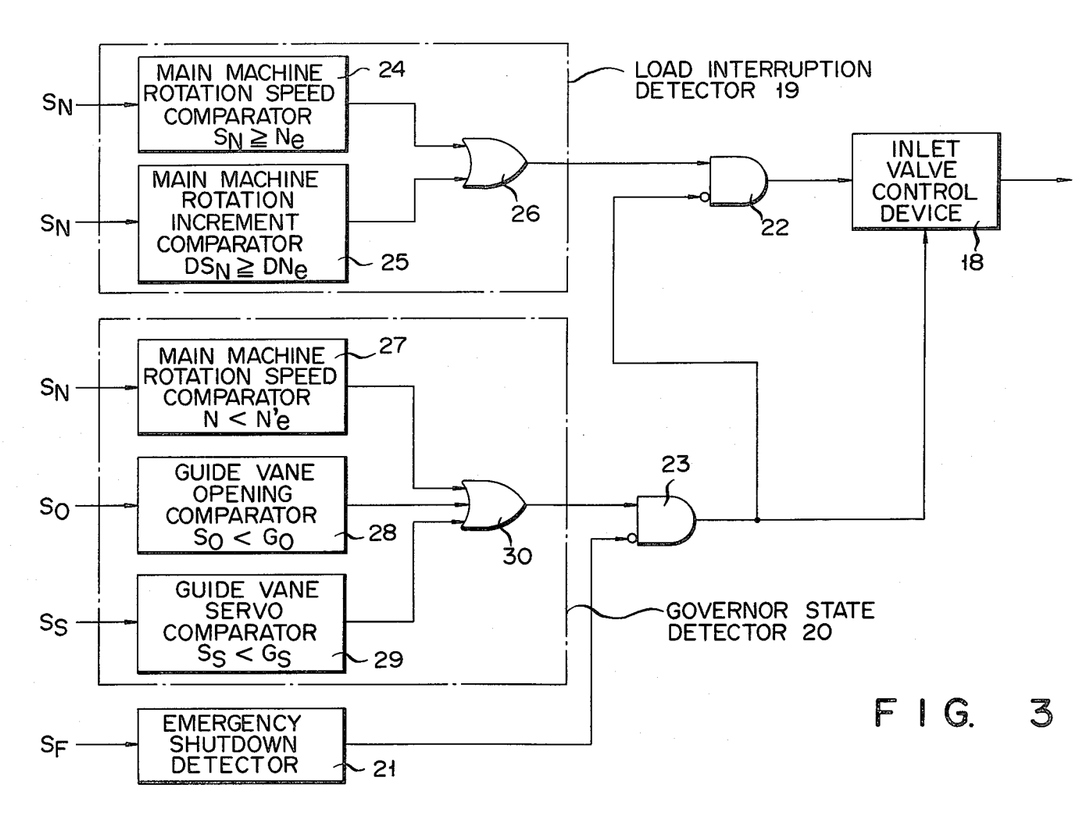
FIG. 3 is a block diagram showing an arrangement of a load rejection control device for explaining one embodiment of this invention.

FIG. 2 is a diagrammatic view showing an ordinary Francis type pump turbine. A pump turbine body 1 comprises a runner 3 mounted on a rotation shaft 2, a casing 5 for causing water flowing into it through a pressure resistant iron pipe 4 to be supplied to the runner 3, and guide vanes 6 for adjusting an amount of water supplied from the casing 5 to the runner 3. Below the pump turbine 1 is disposed a draft 7 for discharging the water supplied from the casing 5 to the runner 3. An inlet valve 8 is disposed in that portion of the pressure iron pipe 4 near to the casing 5. The guide vanes 6 are connected through an operation mechanism 10 to a drive shaft 9a of a hydraulic servo 9 for the guide vanes 6. The inlet valve 8 is connected through an operation mechanism 12 to a drive shaft 11a of a hydraulic servo 11 for the inlet valve. The hydraulic servos 9 and 11 control the pressure of oil in respective cylinders 9b and 11b such that the guide vanes 6 and inlet valve 8 are opened and closed. The servo 9 is controlled by a speed governor 13. That is, the servo 9 detects the rotation speed N of the pump turbine by a signal inputted from a speed signal generator 14 mounted on the rotation shaft and sends, as oil pressure, an operation order to the hydraulic servo 9 through hydraulic systems 13a, 13b according to a change in the rotation speed N of the pump turbine so as to open and close the guide vanes 6 in a controlled fashion. On the operation mechanism 10 for operating the guide vanes 6 a guide vane opening detector 15, such as a potentiometer, is provided which detects the opening of the guide vanes 6. On the drive shaft 9a of the hydraulic servo 9 a servo position detector 16 is disposed to detect the position of movement of the drive shaft 9a. A load rejection control device 17 is provided which receives a signal $S_N$ corresponding to the rotation speed N of the pump turbine sent from the speed signal generator 14, a signal $S_O$ corresponding to the opening of the guide vanes 6 sent from the guide vane opening detector 15, and a signal $S_S$ corresponding to the position of movement of the drive shaft 9a in the hydraulic servo 9 which is sent from the servo position detector 16. An inlet valve control device 18 is connected to the load rejection control device 17 to receive an output signal $S_T$ of the device 17, and comprises an electromagnetic valve and hydraulic section. The control device 18 sends, as oil pressure, an operation order to the hydraulic servo 11 through the hydraulic systems 11a, 11b according to the output signal $S_T$ so as to open and close the inlet valve 8 in a controlled fashion. The control device 17 comprises a load rejection detector 19, governor state detector 20, failure shutdown detector 21, inlet valve close order device 22 and inlet valve open order device 23 as shown in FIG. 3. The load rejection detector 19 comprises a main machine rotation speed comparator 24, main machine rotation increment comparator 25, and OR gate 26, all receiving the signal $S_N$ corresponding to the rotation speed N of the pump turbine as sent from the speed signal generator 14. The main machine rotation speed comparator 24 compares the signal $S_N$ corresponding to the rotation speed N with a set value Ne and produces a logic "1" output when $S_N \geq Ne$. The main machine rotation increment comparator 25 compares the set value DNe with the main machine rotation increment $DS_N$ obtained by differentiating the signal $S_N$ corresponding to the rotation speed N and produces a logic "1" output when $DS_N \geq DNe$. The OR gate 26 sends a logic "1" output when the OR requirements of both the comparators are satisfied. The governor state detector 20 comprises a main machine rotation speed comparator 27 for receiving the input signal $S_N$ corresponding to the rotation speed N of the pump turbine as sent from the speed signal generator 14, a guide vane opening comparator 28 for receiving the signal $S_O$ corresponding to the opening of the guide vanes as sent from the guide vane opening detector 15, a guide vane servo comparator 29 for receiving the input signal $S_S$ corresponding to the position of movement of the drive shaft 9a in the hydraulic servo 9 as sent from the servo position detector 16, and an OR gate 30. The main machine rotation speed comparator 27 compares the set value Ne with the signal $S_N$ corresponding to the rotation speed N and produces a logic "1" output when $S_N < Ne$. The guide vane opening comparator 28 compares the set value $G_O$ with the signal $S_O$ corresponding to the opening of the guide vanes 6 and produces a logic "1" output when $S_O < G_O$. The guide vane servo comparator 29 compares the set value $G_S$ with the signal $S_S$ from the servo position detector 16 and produces a logic "1" output when $S_S < G_S$. The OR gate 30 produces a logic "1" output when the OR requirements of the outputs of the comparators 27, 28 and 29 are satisfied.

When the emergency shutdown detector 21 receives an order signal $S_F$ for emergency shutdown or quick shutdown as sent from the protector which is operated upon failure of the pump turbine, generator etc., though not shown in FIG. 2, it delivers a logic "1" output.

The load rejection detector 19 has its output terminal connected to one input terminal of the inlet valve close order device 22. The output terminal of the inlet valve close order device 22 is connected to one imput terminal of the inlet valve control device 18. The output terminal of the governor state detector 20 is connected to the input terminal of the inlet valve open order device 23, and the output terminal of the failure shutdown detector 21 is connected to the inhibit input terminal of the inlet valve open order device 23. The output terminal of the inlet valve open order device 23 is connected to the inhibit input terminal of the inlet valve close order device 22. The output terminal of the inlet valve open order device 23 is also connected to the other input terminal of the inlet valve control device 18.

The operation of the circuit mentioned will now be explained below.

The signal $S_N$ corresponding to the number of rotations, N, of the pump turbine as outputted from the speed signal generator 14 is inputted to the load rejection control device 17. The signal $S_O$ corresponding to the opening of the guide vanes 6 as outputted from the guide vane opening detector 15 and signal $S_S$ corresponding to the position of movement of the drive shaft 9a of the guide vane hydraulic servo 9 as outputted from the servo position detector 16 are inputted to the load rejection control device 17. The load rejection control device 17 performs the following control operations based on the signals $S_N$, $S_O$ and $S_S$. In the load rejection detector 19, the main machine rotation speed comparator 24 compares the set value Ne with the signal $S_N$ corresponding to the main machine rotation speed and delivers a logic "1" output to the OR gate 26 when $S_N \geq Ne$. The main machine rotation increment comparator 25 compares the set value $S_N$ with the rotation increment $DS_N$ as obtained by differentiating the signal $S_N$ corresponding to the main machine rotation speed N and delivers a logic "1" output to the OR gate 26 when $DS_N \geq DNe$. Thus, the load rejection detector 19 delivers a logic "1" signal to the inlet valve closing order device 22 when the output of the main machine rotation speed comparator 24 or the output of the main machine rotation increment comparator 25 is a logic "1". The inlet valve close order device 22 delivers a close order when the output of the load rejection detector 19 is a logic "1" and output of the inlet valve close order device 23 is a logic "0". The inlet valve control device 18 controls the inlet valve hydraulic pressure servo 11 through the hydraulic systems 18a, 18b such that the inlet valve 8 is closed to a predetermined opening. Even if in the case where the pump turbine falls into a self-excited oscillation state, upon load rejection, due to the guide vanes being not closed, a prescribed opening of the inlet valve 8 must be such as to suppress such a state. The prescribed opening may be made in the "fully closed" state in order to simplify the control device. In the governor state detector 20, the main machine rotation speed comparator 27 compares the set value $Ne'$ with the signal $S_N$ corresponding to the main machine rotation speed N and sends a logic "1" output to the OR gate 30 when $S_N < Ne'$. The guide vane opening comparator 28 compares the set value $G_O$ with the signal $S_O$ corresponding to the opening of the guide vanes 6 and sends a logic "1" signal to the OR gate 30 when $S_O \leq G_O$. The guide vane servo comparator 29 compares the set value $G_S$ with the signal $S_S$ corresponding to the position of movement of the drive shaft 9a of the guide vane hydraulic servo 9 and delivers a logic "1" signal to the OR gate 30 when $S_S \leq G_S$. When, therefore, either output of the comparators 27, 28 and 29 is a logic "1", it is fed to the inlet valve open order device 23. When the output of the governor state detector 20 is a logic "1" and output of the failure shutdown detector 21 is a logic "0", the inlet valve open order device 23 sends a logic "1" output as a lock signal to the inlet valve close order device 22 and at the same time sends an open order to the inlet valve control device 18. The inlet valve control device 18 controls the inlet valve hydraulic servo 11 through the hydraulic systems 18a, 18b to cause the inlet valve 8 to be fully opened. Even where the output of the governor state detector 20 is a logic "1", when the failure shutdown detector 21 is subjected by the remaining protector to emergency shutdown or quick shutdown, the output of the failure shutdown detector 21 becomes a logic "1", causing the inlet valve open order device 23 to be locked. Since the output of the order device 23 is a logic "0", the inlet valve close order device 22 is unlocked, sending a close order to the inlet valve control device 18 so that the inlet valve 8 is fully closed.

The operation control of a water turbine or water pump turbine according to this invention will be explained below in connection with the control of the conventional overspeed relay.

In the control of the conventional overspeed relay, in order for the overspeed relay not to be operated at the main machine rotation speed when the speed governor performs a normal operation upon load rejection to cause the guide vanes to be closed, it has been necessary to set a specified rotation speed to a greater value corresponding to 120 to 140% of the rated rotation speed. Where load rejection occurs and the guide vanes are in the inoperative state, a considerably long time is required from the load rejection until the inlet valve is closed.

According to this invention, since the load rejection detector 19 can be operated a short time after load rejection for the reasons as set out below, a time taken from the load rejection until the inlet valve starts to be closed can be greatly reduced in comparison with that obtained in the conventional control by the overspeed relay.

(1) The operation setting value Ne of the load rejection detector 19 can be set to about 105% of the rated rotation speed, because the frequency variation of the system not associated with any failure is 2 to 3%. For this reason, the time taken from the load rejection until a close order is issued can be reduced as compared with that involved in the conventional overspeed relay.

(2) As the operation requirements of the load rejection detector 19, judgement as to load interruption is made by taking into consideration not only the rotation speed N but also an increment DN per unit time of the rotation speed N. Even if, in general, the generator load is momentarily all interrupted, it takes a certain time for the rotation speed N of the pump turbine to reach the set value Ne due to the inertia of the rotating body. When the load is interrupted, a variation dN/dt obtained by differentiating the rotation speed N with respect to time i.e. the variation DN of the rotation speed N per unit time theoretically becomes a value corresponding to a variation of the load interrupted. This will be expressed as follows:

$$\frac{\pi}{120} GD^2 \frac{dN}{dt} = M$$

$$\therefore \frac{dN}{dt} M / \frac{\pi}{120} GD^2$$

where
N: the number of rotation (r. p. m)
t: the time (sec)
$GD^2$: the inertia of the rotating body (ton.m)
M: an unbalance torque occurring due to the load rejection (ton-m)

Thus, the load rejection detector 19 detects the load interruption without delay with the variation DN per unit time of the rotation speed as a detection element. Under the conditions mentioned, the load rejection detector 19 is immediately operated, upon momentary decrease in the load, irrespective of whether or not the guide vanes are operated. Thus, the inlet valve 6 is closed by the output of the load interruption detector 19 through the inlet valve close order device 22, inlet valve control device 18 and inlet valve hydraulic servo 11. As the governor 13 detects the variation per unit time of the rotation speed, a close order is delivered to the guide vane hydraulic servo 9. If the guide vanes 6 are normally operated, since either of the outputs of the comparators 27, 28 and 29 becomes a logic "1", the governor state detector 20 becomes an logic "1" and the inlet valve open order device 23 delivers a locking order to the inlet valve close order device 22 and an open order to the inlet valve control device 18 to permit the inlet valve 8 to be opened. As a result, the pump turbine is controlled without imparting any hindrance to the governing operation of the governor. Even if the guide vanes are not closed due to any failure, the inlet valve 8 is closed at the moment of load rejection as mentioned above, there being no possibility that the pump turbine will be in the self-excited oscillation state. It is therefore possible to avoid a water column separation due to a pressure drop at the tailrace side which is developed when the pump turbine falls into the self-excited oscillation state. The inlet valve 8 will not be again opened unless the emergency or quick shutdown order is issued under the condition that the number of rotations of the pump turbine is lowered and that $N < Ne$.

In the above-mentioned embodiment, in order to simplify the detector with only the rotation speed of the pump turbine as the detection element of the servo state detector, the object of this invention can be advantageously obtained even if the inlet valve open order device 23 is operated under the condition of $N < Ne$. In this case, the prescribed rotation speed at which the load rejection detector 19 is operated may be set to about 110% of the rated rotation speed, and the prescribed rotation speed $Ne'$ at which the servo state detector 19 is operated may be set to about 105% of the rated rotation speed.

Although in the above-mentioned embodiment a signal corresponding to the opening of the guide vanes and signal corresponding to the position of movement of the drive shaft 9a in the guide vane hydraulic servo 9 are inputted as the detection elements of the governor state, a signal corresponding to the stroke of the guide vanes and a signal corresponding to the stroke of movement of the drive shaft 9a in the guide vane hydraulic servo 9 may be inputted as the detection elements of the governor state. A second embodiment of this invention will be explained below in connection with FIG. 4.

Figure 4:
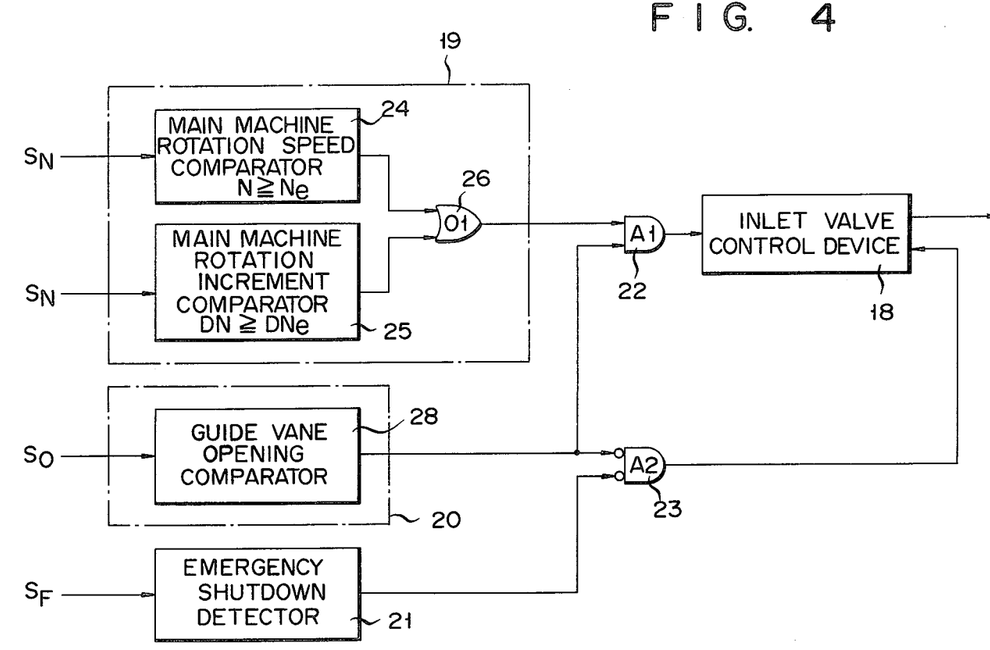
FIGS. 4 and 5 are block diagrams each showing an arrangement of a load rejection control device for explaining another device of this invention.

As shown in FIG. 4, a load interruption detector 19 is the same as in the first embodiment. However, an inlet valve close order device 22 is comprised of an AND gate, a governor state detector 20 is comprised of a guide vane opening comparator 28 and an inlet valve open order device 23 is comprised of an AND gate.

Where, in general, the generator load is interrupted and the guide vanes are not operated, a greater pressure drop is developed at the tailrace side of the pump turbine. This phenomenon is restricted to the case where a greater interruption load is involved. Now suppose that when the power generation operation is effected at a power output of 100%, the load is momentarily interrupted and the guide vanes are not operated. In this case, a pressure drop is produced at the tailrace side, leading to a water column separation. When the generator load is operated at a power output of 70%, there is no risk of any water column separation and it is therefore unnecessary in most cases to momentarily close the inlet valve and thus to protect the main machine. In this embodiment, the inlet valve is not closed with respect to the load rejection when the power generation operation is performed at a power output of less than 70%. In this case, the operation requirements of the respective devices are set as follows:

First, the operation setting value of the guide vane opening comparator 28 in FIG. 4 is set to a value corresponding to the guide vane opening as involved when the generator load is operated at a power output of 70%. For this reason, if the guide vane opening is smaller than its operation setting value, the governor state detector 20 delivers a logic "0" output to the inlet valve close order device 22, thereby locking the operation of the inlet valve close order device 22.

When the power generation operation is performed at a power output of less than 70%, even if the load rejection detector 19 is operated, the output of the governor state detector 20 is a logic "0", no inlet valve close order is delivered from the inlet valve close order device 22. On the other hand, the setting values Ne and DNe of the main machine rotation speed comparator 24 and main machine rotation increment comparator 25, respectively, in the load rejection detector 19 are set to a value at which one of these comparators produces a logic "1" when more than 40% of the whole load is momentarily interrupted. If the load rejection detector 19 is operated with these values so set, more than 40% of the load is necessarily interrupted. Even where, therefore, the generator load before load rejection is 100%, the opening of the guide vanes becomes about 60% if the governor and guide vanes perform the normal operation. If the guide vanes perform the normal operation, the governor state detector 20 produces a logic "0" output and thus no close order is delivered from the inlet valve close order device 26.

In the pump turbine performing a power generation operation at a power output of more than 70%, if about 40% of the load is momentarily interrupted, the inlet valve is immediately closed to a prescribed opening. When no abnormality occurs in the governor and guide vanes, the opening of the guide vanes becomes a value lower than the prescribed value, and the inlet valve close order device 22 is locked, because the output of the governor state detector 20 becomes a logic "0". The inlet valve open order device 23 delivers an open order to the inlet valve control device 18.

Although in the above-mentioned embodiment the guide vane opening comparator 28 is used as the governor state detector, a guide vane servo stroke comparator may be employed instead.

Figure 5:
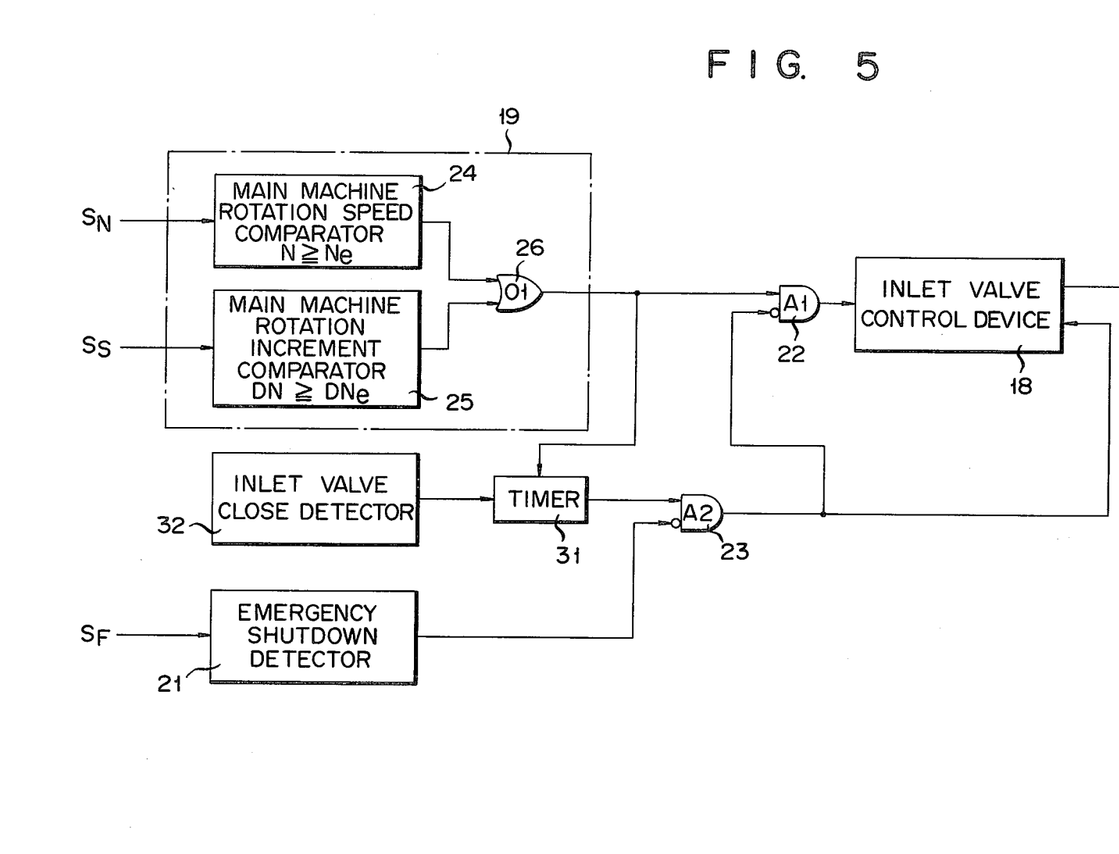

A third embodiment of this invention will be explained below by referring to FIG. 5. In FIG. 5 a load rejection detector 19, inlet valve close order device 22 and inlet valve open order device 23 are the same as in the first embodiment of this invention and further explanation will be omitted. In the embodiment shown in FIG. 5 a simple timer 31 is disposed in the input side of the inlet valve open order device 23 and an inlet valve close detector is located in the input side of the timer 31 to detect the closure of the inlet valve 8. The timer 31 is set upon receipt of a logic "1" signal from the load interruption detector 19 and delivers a logic "1" output to the inlet valve open order device 23 after lapse of a predetermined time Tc. The timer 31 is set upon receipt of a logic "1" signal from the inlet valve close detector 32.

Figure 6:
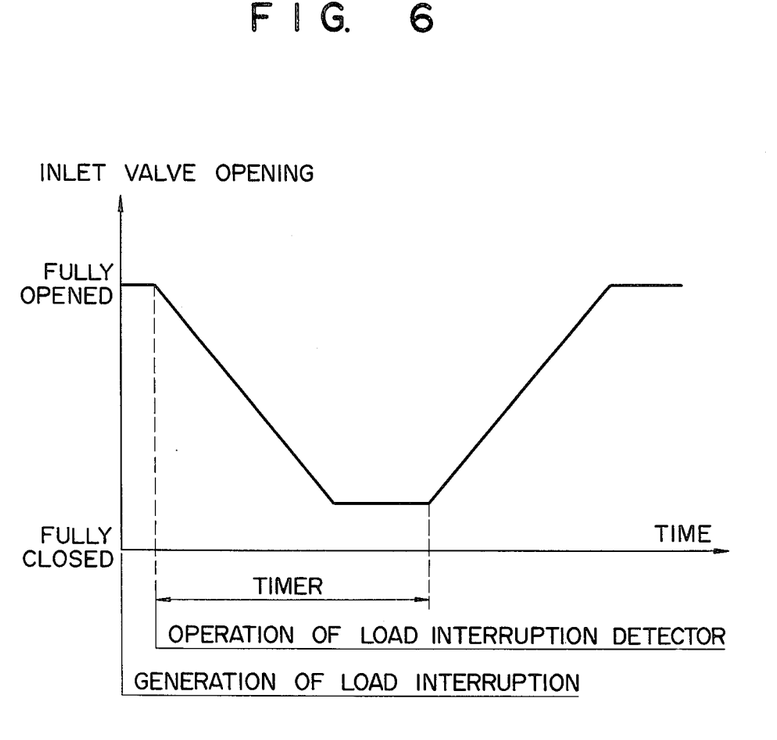
FIG. 6 is a graph showing an inlet valve opening to time relation for explaining the movement of the inlet valve in connection with the device of this invention.

In the embodiment of this invention the operation of the inlet valve 8 is as shown in FIG. 6 irrespective of whether or not the guide vanes are operated. That is, under the condition that the load is momentarily interrupted and that the rotation speed N or an increment DN per unit time of the rotation speed N exceeds a prescribed value Ne, DNe, the load rejection detector 19 is operated, causing its output to be changed from a logic "1" to a logic "0". When this is done, a close order is delivered from the inlet valve close order device 22 to the inlet valve control device 18, closing the inlet valve 8. At this time, the timer 31 is set under the condition that the output of the load rejection detector 19 is changed from the logic "0" to the logic "1". The timer 31 conveys an operation order to the inlet valve open order device 23 a predetermined time Tc after the timer is set. Upon receipt of the operation order the input valve close order device 23 sends an open order to the inlet valve control device 18, fully opening the inlet valve 8. In this embodiment of this invention, unless any emergency shutdown or quick shutdown order is inputted from the other protector to the failure shutdown detector 21, the inlet valve 8 will be opened after the time Tc irrespective of whether or not the guide vanes perform a normal operation. Since the inlet valve 8 is fully opened even at the inoperative time of the guide vanes, the pump turbine will again fall into an unstabilized, self-excited oscillation state. Now suppose that the operation time of the timer 31 is set to be about 60 to 100 seconds. Then, there is a margin of time of 1 to 2 minutes for the inlet valve to again reach a fully opened state after the load is interrupted. During this time period, the other protector detects no closure of the guide vanes, delivering an emergency shutdown or quick shutdown order. As a result, a close order is issued from the inlet valve close order device 22 to the inlet valve control device 18, causing the inlet valve 8 to be fully closed. Thus, there is a high probability that the pump turbine will be shut down, making it possible to protect the pump turbine. In the worst case, the operator at the power station can discover the inoperative state of the guide vanes and protect the pump turbine.

Now assume that, if these protecting measures are not well done, a plurality of pump turbine are operated, for example, in a branch water conduit system with about 100% of the load interrupted and with the guide vanes in the inoperative state. In this case, the inlet valve is closed at least at the instant of load rejection, thus avoiding a water column separation at the tailrace side of the pump turbine. On the other hand, the inlet valve 8 begins to be opened the predetermined time Tc after the timer 31 is set. However, there is no possibility that the self-excited oscillation state of the pump turbine with the guide vanes in the inoperative state will be facilitated due to an influence from the other pump turbines because the guide vanes of the pump turbine perform a normal operation in the substantially fully opened state. In the embodiment of this invention a very simple arrangement is used, but when the guide vanes fall into the inoperative state the pump turbine can be positively protected because the inlet valve is immediately closed. With the guide vanes operated in the normal state the opening of the inlet valve is made smaller and, therefore, there is a possibility that the output of the pump turbine will be restricted and that the number of rotations will be made at less than a rated rotation speed. This is a brief phenomenon on the order of 1 to 2 minutes and can be avoided, if the setting values Ne, DNe of the comparators 24 and 25 at which the load interruption device 19 is operated are each selected to be a proper value and at the same time the prescribed opening of the inlet valve 8 is not too small, for example, when the rotation speed of the pump turbine reaches about 110% of the rated rotation speed with the guide vanes at an opening of 100%. When the generator load becomes zero due to an accident in the electric power system, the governing operation has been performed by the speed governor with the inlet valve in the fully opened state and the opening and closing of the guide vanes have been performed so that the rotation speed of the guide vanes may become a predetermined value. Where, therefore, the S-shaped flow rate characteristic is prominent, the gradient of a curve n~q is abrupt and thus the rotation speed of the pump turbine has been shifted into the reverse pump area with a slight variation of the rotation speed, requiring a fairly long time for the rotation speed to be stabilized. In the embodiment of this invention, however, if the governing operation is performed by the speed governor, the flow rate characteristic of the pump turbine including the inlet valve takes on the curve Lc in FIG. 1, because the inlet valve opening is smaller. As a result, the S-shaped flow rate characteristic curve is relaxed, making it possible to stabilize the rotation speed for a brief time period.

In this way, this invention can be practiced in a variety of ways. Although explanation has been made in connection with the case where the generator load is momentarily interrupted during the power generation operation, this invention can be equally applied to the case where the excitation of the generator vanishes such as a nonexcitation sequence at no load. While explanation has been made in connection with the pump turbine which proves most effective when this invention is applied thereto, this invention can be equally applied to the Francis water turbine. In this case, even if the guide vanes are not closed, for example, upon load rejection, an increase in the rotation speed of the water turbine can be suppressed to a smaller extent as compared with a method for closing the inlet valve through the use of a conventional overspeed relay, thereby preventing the devices from being exposed to severe operation conditions.

According to the respective embodiment of this invention, even if the generator load is momentarily interrupted during the power generation operation, the inlet valve can be immediately closed. Even in cases where the guide vanes are not closed for some reason or other, it is possible to protect the pump turbine due to the presence of the inlet valve. If the inlet valve is not immediately closed upon load rejection the guide vanes are normally operated and the inlet valve is again opened, thus imparting no hindrance to the governing operation by the speed governor. When the governing operation by the governor is performed, the opening of the inlet valve is made smaller and, for this reason, the S-shaped flow rate characteristic curve of the pump turbine including the inlet valve is relaxed, thereby obtaining a stabilized rotation speed for a brief time period. In the conventional branch water conduit system in which one water conduit is shared by a plurality of pump turbines at a pumping-up power station of a high head, if upon load rejection there exists any pump turbine whose guide vanes are in the inoperative state, there is a risk that a water column separation will occur at the tailrace side of the pump turbine mentioned. As a countermeasure against this event, the static draft head is deepened or a meeting point of the branch is moved remote from the pump turbine, thereby alleviating the mutual interference of the pump turbine. This requires exorbitant civil engineering and construction costs. According to this invention, on the other hand, the pump turbine can be immediately and positively protected due to the presence of the inlet valve, even where load rejection occurs and the guide vanes are in the inoperative state, thus avoiding any water column separation at the tailrace side of the pump turbine. This does not necessitate exorbitant civil engineering and construction costs and permits a lowering in the construction cost of the power station.

What is claimed as new and desired to be secured by Letters Patent of the United States is:

1. An apparatus for controlling the operation of a water turbine or a pump turbine equipped with an inlet valve, and guide vanes adapted to be opened and closed under control of a speed governor, comprising:
   (1) means for detecting a rotation speed of the water turbine or the pump turbine during a power generation operation;
   (2) a load rejection control device including;

(a) a load rejection detector connected to receive the rotation speed for comparing the rotation speed of the water turbine or the pump turbine with a first prescribed value and for producing a load rejection signal when the rotation speed of the water turbine or the pump turbine becomes greater than said first prescribed value, (b) a governor state detector for receiving an input signal and for judging whether or not said speed governor performs a normal operation based on said input signal to produce a judgement signal when the speed governor is judged as being normal, (c) an inlet value open order device connected to receive said judgement signal for producing an output signal when neither an emergency shutdown order nor a quick shutdown order is issued, (d) an inlet valve close order device connected to receive the load rejection signal and connected to receive said output signal for producing an inlet valve close order based on the load rejection signal and said output signal, and (3) an inlet valve control device connected to receive the inlet valve close order and connected to receive said output signal of the inlet valve open order device for producing a control signal, to close the inlet valve to a prescribed opening when said inlet valve close order is received and for producing a control signal to open the inlet valve to a maximum opening when said output signal is received.

2. An apparatus according to claim 1, in which a load rejection detector selects as said prescribed value the rotation speed of the water turbine or the pump turbine when more than 40% of the whole generator load is interrupted, the governor state detector receives the opening of the guide vanes as said input signal, judges whether or not the speed governor performs the normal operation by comparing the opening of the guide vanes with a prescribed opening thereof, and produces said judgement signal when said opening becomes smaller than the prescribed opening, and said governor state detector selects as the prescribed opening the opening of the guide vanes when the generator is operated at more than 70% of a rated load.

3. An apparatus according to claim 1, in which a load rejection detector selects as said prescribed value the rotation speed of the water turbine or the pump turbine when more than 40% of the whole generator load is interrupted, the governor state detector receives the opening stroke of the guide vanes as said input signal, judges whether or not the speed governor performs the normal operation by comparing the opening stroke thereof, and produces said judgement signal when said opening stroke becomes smaller than the prescribed opening stroke, and said governor state detector selects as the prescribed opening stroke the opening stroke of the guide vanes when the generator is operated at more than 70% of a rated load.

4. An apparatus for controlling the operation of a water turbine or a pump turbine equipped with an inlet valve, and guide vanes adapted to be opened and closed under control of a speed governor, comprising:

(1) means for detecting a rotation speed of the water turbine or the pump turbine during a power generation operation;

(2) a load rejection control device including (a) a load rejection detector connected to receive the rotation speed for determining an increment speed per unit time from said detected rotation speed of the water turbine or the pump turbine and for comparing said increment with a prescribed increment and for producing a load rejection signal when the increment becomes greater than the prescribed increment, (b) a governor state detector for receiving an input signal and for judging whether or not a speed governor performs a normal operation based on said input signal to produce a judgement signal when the speed governor is judged as being normal, (c) an inlet valve open order device connected to receive said judgement signal for producing an input signal when neither an emergency shutdown order nor a quick shutdown order is issued, (d) an inlet valve close order device connected to receive the load rejection signal and connected to receive said output signal for producing an inlet valve close order based on the load rejection signal and said output signal, (3) an inlet valve control device connected to receive an inlet valve close order and connected to receive said output signal of the inlet valve open order device for producing a control signal to close the inlet valve to a prescribed opening when said inlet valve close order is received and for producing a control signal to open the inlet valve to a maximum opening when said output signal is received.

5. An apparatus according to claim 4, in which a load rejection detector selects as said prescribed increment the increment of the rotation speed of the water turbine or the pump turbine when more than 40% of the whole generator load is interrupted, and the governor state detector receives the opening of the guide vanes as said input signal, judges whether or not the speed governor performs the normal operation by comparing the opening of the guide vanes with a prescribed opening thereof, and produces said judgement signal when said opening becomes smaller than the prescribed opening, and said governor state detector selects as the prescribed opening the oepning of the guide vanes when the generator is operated at more than 70% of a rated load.

6. An apparatus according to claim 4, in which a load rejection detector selects as said prescribed increment the increment of the rotation speed of the water turbine or the pump turbine when more than 40% of the whole generator load is interrupted, and the governor state detector receives the opening stroke of the guide vanes as said input signal, judges whether or not the speed governor performs the normal operation by comparing the opening stroke of the guide vanes with a prescribed opening stroke thereof, and produces said judgement signal when said opening stroke becomes smaller than the prescribed opening stroke, and said governor state detector selects as the prescribed opening stroke the opening stroke of the guide vanes when the governor is operated at more than 70% of a rated load.

7. An apparatus according to claim 1 or 4, in which said inlet valve control device produces the first control signal to fully close the inlet valve.

8. An apparatus according to claim 1 or 4, in which said governor state detector includes rotation speed comparator means for comparing the rotation speed of the water turbine or the pump turbine with a prescribed value and, when the rotation speed becomes lower than the prescribed value, judging the speed governor as performing a normal operation.

9. An apparatus according to claim 1 or 4, in which the governor state detector includes guide vane opening comparator means for comparing the opening of the guide vanes with a prescribed value and, when the opening of the guide vanes becomes smaller than the prescribed value, judging said speed governor as performing a normal operation.

10. An apparatus according to 1 or 4, in which said governor state detector includes:
   (a) a rotation speed comparator for receiving said rotation speed for comparing the rotation speed with a prescribed value for producing a first comparison signal when said rotation speed becomes smaller than a prescribed value;
   (b) a guide vane opening comparator for receiving the opening signal of the guide vanes for comparing the opening of the guide vanes with a prescribed opening of the guide vanes and for producing a second comparison signal when said opening becomes smaller than the prescribed opening; and
   (c) an OR gate connected to receive the first and second comparison signals for producing said judgement signal.

11. An apparatus according to claim 1 or 4, in which the water turbine or the pump turbine includes a hydraulic servo for driving the guide vanes, and said governor state detector receives the position of movement of the hydraulic servo as an input signal, judges whether or not the governor performs a normal operation by comparing the position of movement of the hydraulic servo with a prescribed position of movement thereof, and produces said judgement signal when said position becomes smaller than said prescribed position.

12. An apparatus according to claim 1 or 4, in which the water turbine or the pump turbine includes a hydraulic servo for driving the guide vanes, in which said governor state detector includes
   (a) a rotation speed comparator for receiving said rotation speed for comparing the rotation speed with a prescribed value for producing a first comparison signal when said rotation speed becomes smaller than a prescribed value,
   (b) a guide vane opening comparator for receiving the opening signal of the guide vanes for comparing the opening of the guide vanes with a prescribed opening of the guide vanes and for producing a second comparison signal when said opening becomes smaller than the prescribed opening,
   (c) a guide vane servo comparator for receiving said position of movement of the hydraulic servo as an input and for comparing said position of movement of the hydraulic servo with a prescribed position thereof for producing a third comparison signal when said position thereof becomes smaller than a prescribed position, and
   (d) an OR gate connected to receive the first, second and third comparison signals for producing said judgement signal.

13. An apparatus according to claim 1 or 4, in which said governor state detector receives an opening stroke of the guide vanes as said input signal, judges whether or not the speed governor performs the normal operation by comparing said opening stroke with a prescribed opening stroke thereof and produces said judgement signal when said opening stroke becomes smaller than the prescribed opening stroke thereof.

14. An apparatus according to claim 1 or 4, in which
   (a) a rotation speed comparator for receiving said rotation speed for comparing the rotation speed with a prescribed value for producing a first comparison signal when said rotation signal becomes smaller than a prescribed value,
   (b) a guide vane opening stroke comparator for receiving a guide vane opening stroke for comparing the guide vane opening stroke with a prescribed guide vane opening stroke and for producing a fourth comparison signal when said opening stroke becomes smaller than the prescribed opening stroke, and
   (c) an OR gate connected to receive the first and fourth comparison signals for producing said judgement signal.

15. An apparatus according to claim 1 or 4, in which the water turbine or pump turbine further includes a hydraulic servo for driving the guide vanes, and said governor state detector receives a movement stroke of the hydraulic servo as said input signal, judges whether or not the speed governor performs the normal operation by comparing said movement stroke with a prescribed movement stroke, and produces said judgement signal when said movement stroke becomes greater than the prescribed movement thereof.

16. An apparatus according to claim 1 or 4, in which the water turbine or pump turbine further includes a hydraulic servo for driving the guide vanes, and said governor state detector includes,
   (a) a rotation speed comparator for receiving said rotation speed for comparing the rotation speed with a prescribed value for producing a first comparison signal when said rotation speed becomes smaller than a prescribed value,
   (b) a guide vane opening stroke comparator for receiving a guide vane opening stroke for comparing the guide vane opening stroke with a prescribed guide vane opening stroke and for producing a fourth comparison signal when said opening stroke becomes smaller than the prescribed opening stroke,
   (c) a guide vane servo stroke comparator for receiving a movement stroke of the hydraulic servo for compraring the movement stroke with a prescribed movement stroke and for producing a fifth comparison signal when said movement stroke becomes greater than the prescribed movement stroke, and
   (d) an OR gate connected to receive the first, fourth and fifth comparison signals for producing said judgement signal.

17. An apparatus for controlling the operation of a water turbine or a pump turbine equipped with an inlet valve, and guide vanes adapted to be opened and closed under control of a speed governor comprising:
   (1) means for detecting a rotation speed of a water turbine or the pump turbine during the power generation operation
   (2) a load rejection control device including
      (a) a load rejection detector connected to receive the rotation speed for comparing the rotation speed of the water turbine or the pump turbine with a prescribed value and for producing a load rejection signal when the rotation speed of the water turbine or the pump turbine becomes greater than the prescribed value, (b) timer means connected to receive said load rejection signal and connected to receive a signal showing that the inlet valve is closed, and set by said load rejection signal for producing a timer output signal a predetermined time after the timer means is set, and reset by said signal, (c) an inlet valve open order device connected to receive said timer output signal for producing an output signal when neither an emergency shutdown order or a quick shutdown order is issued (d) an inlet valve close order device connected to receive the load rejection signal and connected to receive said output signal for producing an inlet valve close order based on the load rejection signal and said output signal;

(3) an inlet valve control device connected to receive the inlet valve close order and connected to receive said output signal of the inlet valve open order device for producing a control signal, to close the inlet valve to a prescribed opening when said inlet valve close order is received and for producing a control signal to open the inlet valve to a maximum opening when said output signal is received.

18. An apparatus for controlling the operation of water turbine or a pump turbine equipped with an inlet valve, and guide vanes adapted to be opened and closed under control of a speed governor comprising (1) means for detecting a rotation speed of the water turbine or the pump turbine during the power generation operation (2) a load rejection control device including (a) a load rejection detector connected to receive the rotation speed for determining an increment speed per unit time from the detector rotation speed of the water turbine or the pump turbine and for comparing said increment with a prescribed increment and for producing a load rejection signal when the increment becomes greater than the prescribed increment, (b) timer means connected to receive said load rejection signal and connected to receive a signal showing that the inlet valve is closed, and set by a load rejection signal for producing a timer output signal a predetermined time after the timer means is set, and reset by said signal, (c) an inlet valve open order device connected to receive said timer output signal for producing an output signal when neither an emergency shutdown order nor a quick shutdown order is issued, and (d) an inlet valve close order device connected to receive the load rejection signal and connected to receive said output signal for producing an inlet valve close order based on the load rejection signal and said output signal, (3) an inlet valve control device connected to receive the inlet valve close order and connected to receive said output signal of the inlet valve open order device for producing a control signal, to close the inlet valve to a prescribed opening when said inlet valve close order is received and for producing a control signal to open the inlet valve to a maximum opening when said output signal is received.

* * * * *